United States Patent [19]

Yoshida et al.

[11] 4,062,129
[45] Dec. 13, 1977

[54] ARRANGEMENT FOR PREPARING HOT COMPRESSED AIR OF REDUCED MOISTURE CONTENT SUITABLE FOR USE IN OPERATION OF BLAST FURNACE

[75] Inventors: Toru Yoshida, Hachioji; Kameo Hosoi, Warabi; Tokuzo Yoshida, Oita; Kazuyuki Shimizu, Bungotakada; Koithiro Nakagawa, Oita, all of Japan

[73] Assignees: Takasago Thermal Engineering Co., Ltd.; Nippon Steel Corporation, both of Tokyo, Japan

[21] Appl. No.: 710,679

[22] Filed: Aug. 2, 1976

[51] Int. Cl.$^2$ .............................................. F26B 21/06
[52] U.S. Cl. .................................... 34/80; 432/40; 432/180; 165/8; 62/94; 62/271
[58] Field of Search ............... 62/90, 93, 94, 176 D, 62/271; 165/8-10, 59, 66, 107; 34/80, 79, 82, 71, 75, 9; 432/179-181, 223, 40

[56] References Cited

U.S. PATENT DOCUMENTS

| | | | |
|---|---|---|---|
| 2,085,964 | 7/1937 | Fonda | 62/94 |
| 3,844,737 | 10/1974 | Macriss et al. | 62/271 |
| 3,855,719 | 12/1974 | Jonsson | 34/9 |
| 3,916,644 | 11/1975 | Nasser | 62/90 |
| 3,966,393 | 6/1976 | Takenchi | 432/40 |
| 4,000,775 | 1/1977 | Eisenstein | 165/8 |

Primary Examiner—John J. Camby
Assistant Examiner—Henry C. Yuen
Attorney, Agent, or Firm—Kane, Dalsimer, Kane, Sullivan and Kurucz

[57] ABSTRACT

Arrangement for preparing dry hot compressed air to be supplied to blast furnace, wherein a heat exchanger and a dehydrater assembly comprising a gas permeable regenerative moisture absorbing rotor are arranged in the air passage from blower to hot air furnaces so that the hot compressed air from the blower may be used to heat the dehydrated air and to regenerate the rotor. Air leakage between regenerating and dehydrating zones in the dehydrater is prevented by sealing those clearances where otherwise such leakage would occur by packing elements to form sealed spaces and externally introducing dry pressurized air into each of said spaces.

13 Claims, 6 Drawing Figures

ARRANGEMENT FOR PREPARING HOT COMPRESSED AIR OF REDUCED MOISTURE CONTENT SUITABLE FOR USE IN OPERATION OF BLAST FURNACE

The present invention relates to an arrangement for preparing hot compressed air of a reduced moisture content suitable for use in the operation of a blast furnace. More particularly it relates to such an arrangement in which a heat exchanger and an improved dehydrater are incorporated into the air passage from a blower designed for use in the operation of a blast furnace and one or more hot air furnaces, and by which the dehydration process can be effectively and stably carried out without requiring any external heat source.

In operation of a blast furnace variations in the moisture content of air supplied to the blast furnace cause the reactions in the furnace to undesirably fluctuate, and excessive moisture contents often adversely affect those reactions. Accordingly, it is desired that the moisture content of air supplied to a blast furnace be controlled so that it does not exceed a predetermined level irrespective of the seasons of the year.

In view of the advanced technology recently available for removing moisture from air, it might be supposed that dehydration of air to be supplied to a blast furnace would not be very difficult. However, this is not the case. Actually dehydration of air in the operation of a blast furnace involves various problems which are not encountered in other fields. Among others, a blower specially designed for supplying hot compressed air to a blast furnace is extremely powerful. Atmospheric air may be compressed by such a blower to form a stream of air having a temperature of 150° to 250° C, a pressure of 3.5 to 5.0 kg/cm$^2$G and a flow rate of as high as 5,000 to 12,000 Nm$^3$/min. The stream of air so formed is further heated in hot air furnaces to a temperature of 500° to 1200° C before it is introduced into a blast furnace. Application of conventional dehydration techniques to dehydration treatment of such a high flow rate of compressed air has been found unsatisfactory.

Improved apparatus for drying compressed air are disclosed in U.S. Pat. No. 3,847,578, to Carl G. Munters, and U.S. Pat. No. 3,855,719, to Uno I. Johnson. It is not believed, however, that the apparatus disclosed in these U.S. patents have been developed with the purpose in mind of their application to the dehydration treatment of a large quantity of compressed air. If they were applied, as they are, to compressed air to be supplied to a blast furnace at the discharge side of the blower, some problems would occur. With the apparatus disclosed in U.S. Pat. No. 3,847,578, leakage of air from the regenerating zone to the dehydrating zone is expected. The apparatus disclosed in U.S. Pat. No. 3,855,719 is provided with a certain sealing means. However, the sealing means disclosed therein is mechanically complicated in that it includes an ejector, a pipe for communicating the regenerating zone with the dehydrating zone, and other members, and thus, it is doubtful whether the dehydration apparatus may stably and semi-permanently operate when it is arranged at the discharge side of the blower in an installation attached to a blast furnace which is not allowed to malfunction or stop operating.

For the reasons mentioned above, but especially owing to the leakage problem, dehydration treatment of air to be supplied to a blast furnace, if carried out, has heretofore been conducted at the input side of the blower. However, dehydration under atmospheric pressure increases the volume of air to be treated and, in turn, requires massive installations. Furthermore, where a regenerative moisture absorbent is used, a large quantity of hot air is required for the regeneration purpose, and thus, it is necessary to provide a powerful external heat source. Obviously, this is not advantageous from the point of view of heat economy.

It is the aim of the present invention to solve the problems discussed above.

An object of the invention is to provide an arrangement for preparing hot compressed air of a reduced moisture content which satisfactorily operates as an attachment to a blast furnace for successively obtaining hot air to be supplied to the blast furnace.

Another object of the invention is to provide a dehydrater assembly having a simple mechanical structure which can semi-permanently operate to successively and effectively remove moisture from an air stream of high flow rate having elevated temperature and pressure when operatively arranged in the passage of such air from a blower and hot air furnaces.

A further object of the invention is to provide an arrangement for supplying air to a blast furnace wherein a heat exchanger and a dehydrater assembly comprising a gas permeable moisture absorbing regenerative rotor are arranged so that sensible heat of the hot compressed air coming from a blower may be effectively utilized both to heat the dehydrated air and to regenerate the rotor, thereby to achieve improved heat economy.

A still further object of the invention is to provide an arrangement for preparing air to be supplied to a blast furnace including an improved dehydrater assembly in which the leakage problem due to pressure difference between the regenerating and dehydrating zones has been overcome.

Other objects of the invention will be apparent from the following description and appended claims.

These objects are achieved in accordance with the invention by an arrangement for preparing hot compressed air of a reduced moisture content suitable for use in the operation of a blast furnace, comprising a conventional blower designed for use in the operation of a blast furnace and one or more conventional hot air furnaces characterized in that into the air passage from said blower to said hot air furnaces there are incorporated:

a dehydrater assembly comprising a gas permeable rotor containing a regenerative hygroscopic substance impregnated therein and at least one cooler for condensing moisture in the air;

a heat exchanger arranged so that a part or all of the hot compressed air coming from said blower may transfer its sensible heat to the dehydrated air coming from said dehydrater assembly;

means for passing the remainder or all of the hot compressed air coming from said blower to said dehydrater assembly, and means for passing all the dehydrated air coming from said dehydrater assembly to said heat exchanger, whereby all the air to be introduced into said hot air furnaces is caused to pass through said dehydrater assembly and heat exchanger, and is dehydrated.

Preferably said dehydrater assembly further comprises a generally cylindrical casing, spaced parallel partition plates for dividing the inside space of said casing into regenerating and dehydrating zones, said rotor being rotatably mounted so as to radially extend across approximately the full cross-sections of both the regenerating and dehydrating zones, in which a clearance formed between a peripheral surface of said rotor and an inner surface of said casing is sealed by annular packing elements to define an annular space; clearances formed between the flat surfaces of said rotor and the ends of said partition plates facing said rotor are sealed by elongated packing elements to define elongated spaces, and, for each of said sealed spaces there is provided a port for introducing dry pressurized air, having a pressure higher than the pressure the air passing through the regenerating zone, into each of the spaces from a separate source, thereby preventing the air from leaking from the regenerating zone into the dehydrating zone.

The invention will be further described with reference to the accompanying drawings which show illustrative embodiments of the invention and in which.

In the various figures the same reference numerals have been used for equivalent parts.

Figure 1:
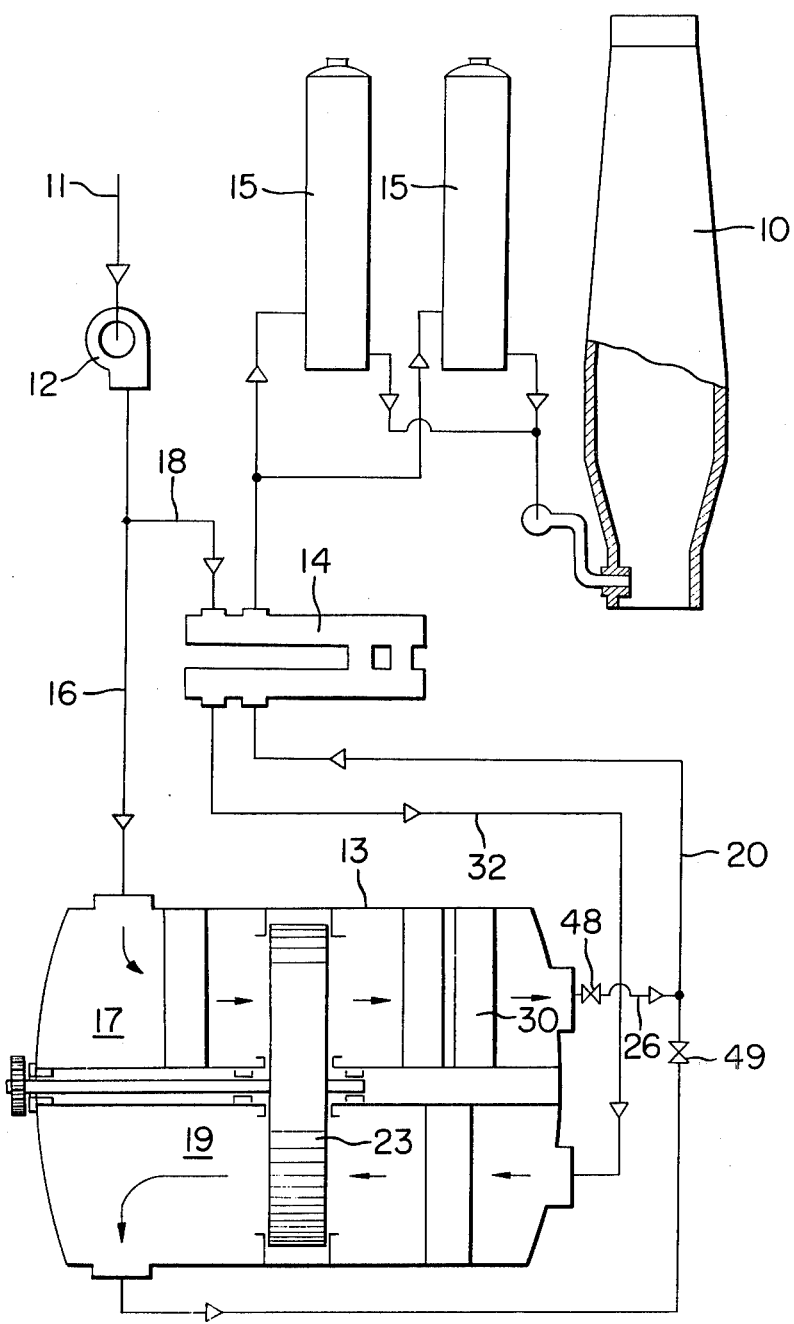
FIG. 1 illustrates one embodiment of the arrangement in accordance with the invention.

Referring to FIG. 1, operation of a blast furnace 10 requires a great deal of dry, hot compressed air, for example 5,000 to 12,000 nm$^2$/min of air having a temperature of 500° to 850° C, a pressure of 3.0 to 4.5 kg/cm$^2$G and a moisture content of 2 to 5 g/kg. The illustrated arrangement for preparing such air with such a flow rate from atmospheric air 11 normally containing 15 to 20 g/kg of moisture, comprises a blower or compressor 12 specially designed for use in the operation of a blast furnace, a dehydrater assembly 13, a heat exchanger 14 and hot air furnaces 15. In the existing arrangement, as far as is known, the blower 12 is directly communicated with the hot air furnaces 15 by means of connecting conduits, and the dehydration process, if any, is applied to atmospheric air before it enters the blower 12. In the illustrated arrangement the dehydrater assembly 13, which will be described in detail hereinafter with reference to FIGS. 2 through 4, and the heat exchanger 14 are incorporated into the air passage from the blower 12 to the hot air furnaces 15 in the following manner. The heat exchanger 14 is arranged so that a part of the hot compressed air coming from the blower 12 through a conduit 18 may undergo indirect heat exchange with all of the dehydrated air coming from the dehydrater assembly 13 through a conduit 20. The dehydrater assembly 13 is arranged so that the remainder of the hot compressed air coming from the blower 12 through a conduit 16 is introduced into a regenerating zone 17 of the dehydrater assembly 13 while the air leaving the heat exchanger 14 through a conduit 32 is introduced into a dehydrating zone 19 of the dehydrater assembly, and; that the air which has passed through a regenerating side of a rotor 23 is, after passing through a cooler 30, combined with the dehydrated air which has passed through a dehydrating side of the rotor, and the combined stream of dehydrated air is passed through the conduit 20 to the heat exchanger 14. By this arrangement, the air which has a temperature of 180° to 250° C, a pressure of 3.5 to 5.0 kg/cm$^2$G and a moisture content of 15 to 20 g/kg when it leaves the blower 12, is converted to air having a temperature of 150° to 220° C, a pressure of 3.0 to 4.5 kg/cm$^2$G and a moisture content of 2 to 5 g/kg at the time it leaves the heat exchanger 14 after the dehydration process. From a comparison of the above figures it will be understood that only the moisture content is greatly reduced and that there is a minimum loss of temperature and pressure. It should be appreciated that temperatures of the air at various points along the air passage may be appropriately chosen, depending upon the size of the blast furnace.

Figure 2:
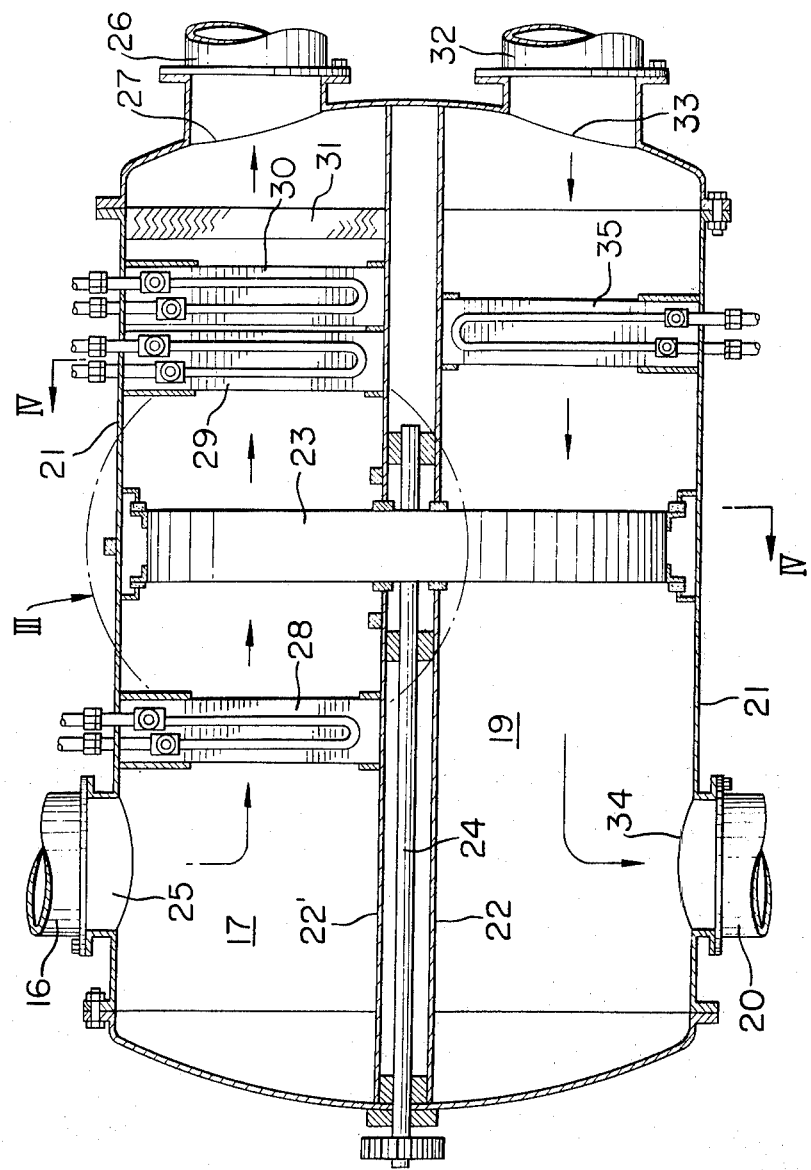
FIG. 2 is an enlarged horizontal sectional view of the dehydrater assembly involved in the arrangement of FIG. 1.

FIG. 2 is an enlarged horizontal sectional view illustrating details of the dehydrater assembly 13 shown in FIG. 1. The illustrated dehydrater assembly compresses a rotor 23 and coolers 28, 29, 30 and 35 located in a generally cylindrical casing 21, the inside space of which is divided into two spaces 17 and 19 by a partition comprising spaced parallel partition plates 22 and 22' extending approximately the full height and length of said inner space. The rotor 23 radially extends across approximately the full cross-sections of both spaces 17 and 19 and is supported by a shaft 24 located in the space between the partition plates 22 and 22'. The space 17 constitutes a regenerating zone while the space 19 constitutes a dehydrating zone. The rotor 23 has a gas permeable honeycomb structure made of asbestos material impregnated with a hygroscopic substance such as lithium chloride. Such a structure is well-known in the art, for example from U.S. Pat. Nos. 3,231,409 and 3,307,617. The casing 21 is provided, in its regenerating zone side, with an opening 25 to be connected to the conduit 16 for introducing a part of the hot compressed air of a high moisture content from the blower 12, and also with an opening 27 to be connected to a branch conduit 26, which is in turn connected to the conduit 20 for passing the dehydrated air to the heat exchanger 14. The rotor 23 is positioned between the openings 25 and 27. In the regenerating zone 17, the cooler 28 is arranged between the opening 25 and the rotor 23, and there are arranged the coolers 29 and 30 as well as an eliminator 31 between the rotor 23 and the opening 27. The casing 21 is further provided, in its dehydrating zone side, with an opening 33 to be connected to the conduit 32 for introducing the remainder of the hot compressed air of a high moisture content from the blower 12 after it has passed through the heat exchanger 14 and also with an opening 34 to be connected to the conduit 20 for passing the dehydrated air to the heat exchanger. The rotor 23 is also positioned between the openings 33 and 34. In the dehydrating zone 19, there is arranged the cooler 35 between the opening 33 and the rotor 23.

Figure 3:
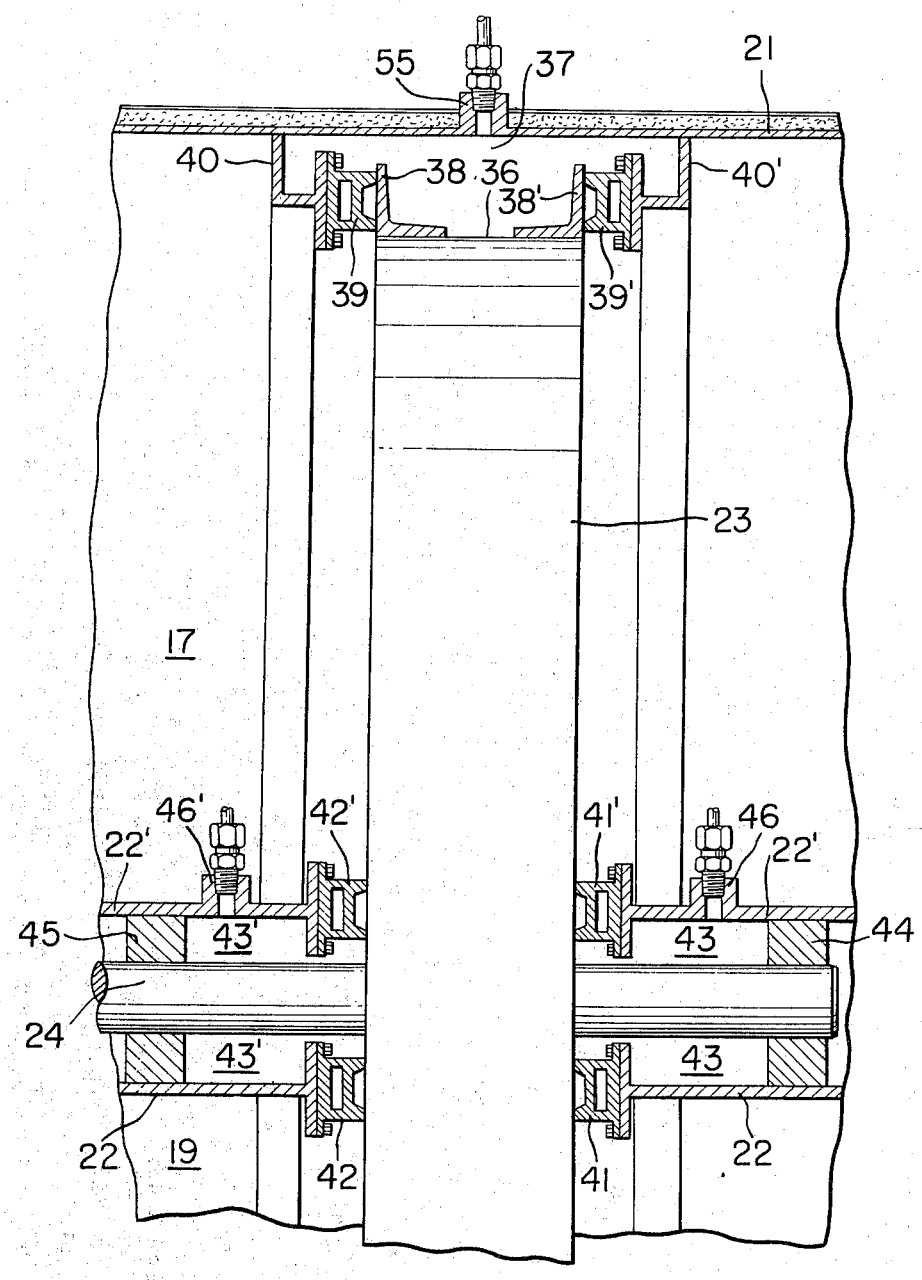
FIG. 3 is a further enlarged partial view of the rotor in the dehydrater assembly of FIG. 2.

FIG. 3 is an enlarged view of the part of the rotor 23 designated by the arrow III in FIG. 2, and shows the details of the sealing means in accordance with the invention. According to the illustrated embodiment, an annular space 37 formed between a peripherial surface 36 of the rotor 23 and an inner surface of the casing is defined by, in addition to said peripheral and inner surfaces, flanges 38 and 38' fixed on the peripheral surface of the rotor 23 along both edges thereof, packing elements 39 and 39' (annular bodies concentric with the rotor 23) containing outer surfaces of the flanges 38 and 38', and wall elements 40 and 40' (annular and concentric with the casing 21) fixed on the casing along its inner surface for supporting the packing elements 39 and 39'. The casing 21 is provided with a port 55 for introducing dry pressurized air, which has been separately prepared, into the annular space 37. The port 55 is connected to a separate apparatus (not shown) for preparing dry pressurized air. Dry pressurized air having a pressure higher than that of the air being processed in the dehydrater assembly 13 is prepared by the separate apparatus and introduced through the port 55 into the annular space 37 so as to maintain the pressure in said space higher than that of the air being processed. The presence of such dry pressurized air in the annular space 37 completely prevents the air being processed from leaking from the high pressure side (that is the regenerating zone 17) through the space 37 to the low pressure side (that is the dehydrating zone 19). Where a small gap is formed between the flanges and packing elements for some reason during the operation of the dehydrater assembly, the above-mentioned dry pressurized air leaks through the gap to the regenerating or dehydrating zone, but it does not adversely affect the nature of the product air to be used in operating the blast furnace. Even on such an occasion, the air being processed in the regenerating or dehydrating zone is completely prevented from flowing through the gap into the annular space 37.

Figure 4:
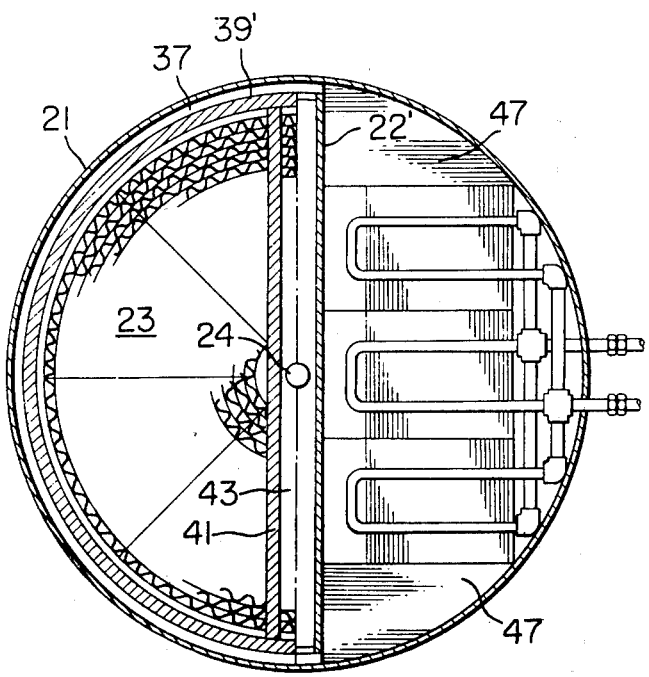
FIG. 4 is a cross-sectional view of the dehydrater assembly of FIG. 2 taken along the line IV—IV, as seen from the right.

The leakage problem due to clearances inevitably formed between the rotor 23 and each partition plate 22 or 22' is also solved by substantially the same measure as described above with respect to the clearance between the rotor 23 and the casing 21. Again referring to FIG. 3, vertically extending spaced parallel partition plates 22 and 22', which include the rotor shaft 24 in the space therebetween, securely support packing elements 41, 41' and 42, 42' at their ends facing the rotor 23, each of said packing elements vertically extending while contacting one of the flat surfaces of the cylindrical rotor 23, whereby vertically extending elongated spaces 43 and 43' are formed on both sides of the rotor 23. The space 43 is defined vertically by the partition plates 22 and 22' together with the packing elements 41 and 41', a vertically extending inside partition wall 44 having a bearing for the rotor shaft 24 and one of the flat surfaces of the rotor 23 on one hand, and horizontally by the inner surface of the casing 21 and the packing element 39', on the other hand. Likewise the space 43' is defined vertically by the partition plates 22 and 22' together with the packing elements 42 and 42', a vertically extending inside partition wall 45 having a bearing for the rotor shaft 24 and the other flat surface of the rotor on one hand, and horizontally by the inner surface of the casing 21 and the packing element 39, on the other hand. The shape of the space 43 or 43' can be best seen in FIG. 4, which is a cross-sectional view of the dehydrater assembly of FIG. 2, taken along line IV—IV. It should be noted, however, that the right half of FIG. 4 illustrates the cross-section of the dehydrater assembly shown in FIG. 2 taken at the position where the cooler 29 is located, whereas the left half of FIG. 4 shows the cross-section of the same dehydrater assembly taken at the position where the packing element 41 (FIG. 3) is located. As can be seen in FIG. 4, the space 43 is a vertically elongated space which is independent of the annular space 37. Referring again to FIG. 3, the partition plate 22' is provided with ports 46 and 46' for introducing dry pressurized air into the spaces 43 and 43'. These ports 46 and 46' are connected to an apparatus for preparing dry pressurized air as is used for preparing such air in order to introduce it into the annular space 27. By maintaining the dry air of higher pressures in the spaces 43 and 43', the leaking out of air from the regenerating zone into the dehydrating zone can be completely eliminated as discussed hereinabove with respect to the annular space 37.

The rotor 23 having the sealing means as disclosed herein is caused to very slowly rotate by a driving force transmitted through its shaft 24. As the rotor rotates, moisture contained in wet air of a low temperature passing through the dehydrating zone 19 is absorbed by the hygroscopic substance impregnated in the rotor 23 as the air passes through the rotor, and the moisture so absorbed is then released into air passing through the regenerating zone 17 which has a higher temperature and a lower relative humidity. Such a cycle of dehydration and regeneration is repeated. With the dehydrater assembly provided with the sealing means as disclosed herein, it has been found that the amount of moisture lost by the air passing through the rotor 23 in the dehydrating zone 19 is substantially the same as that gained by the air passing through the rotor 23 in the regenerating zone 17.

Before and/or after passing through the rotor 23, the air may be cooled by a suitable cooler to a suitable temperature and drained. The coolers 28 and 29 shown in FIG. 2 are those through which a brine may be passed, for example, whereas the coolers 30 and 35 in the same figure are those through which cold water prepared in a refrigerator may be passed. Each cooler is a finned tube heat exchanger. While the section of only the cooler 29 is illustrated in the right half of FIG. 4, the other coolers 28, 30, 35 may have substantially the same structure as that of the cooler 29, and clearances between each cooler and the casing 21 are shielded by blind plates 47.

By way of an example, the dehydrater assembly as illustrated in FIGS. 2 through 4 may be operated under the following conditions. Air introduced into the dehydrater assembly 13 through the opening 25 having a temperature of 240° C, a pressure of about 4 kg/cm²G and a moisture content of 19.4 g/kg is cooled by means of the cooler 28 to a temperature of 140° C and is passed through the rotor 23 whereupon the temperature of the air is reduced to 80° C. The air is then further cooled by the cooler 29 to a temperature of 35° C and by the cooler 30 to a temperature of 23° C. The air which has passed through the rotor 23 and gained a high moisture content is cooled and drained during its passage through the coolers 29 and 30, and has a moisture content of 3.8 g/kg at the time it leaves the opening 27. The water, which has precipitated in the coolers is discharged through a drainage (not shown) provided at the bottom of the casing and then outside the system. Air introduced into the dehydrater assembly 13 through the opening 33 having a temperature of 80° C, a pressure of 3.97 kg/cm²G and a moisture content of 19.4 g/kg is cooled and drained by means of the cooler 35 to a temperature of 35° C and a moisture content of 7.3 g/kg. After having passed through the rotor 23, the air has a temperature of 60° C and a moisture content of 3 g/kg as it leaves the opening 34. The flow rates of the air streams leaving the openings 27 and 34 are suitably controlled by valves 48 and 49 (FIG. 1) in the conduits 26 and 20, respectively. During the operation the annular space 37 and the elongated spaces 43 and 43' (FIGS. 3 and 4) are maintained at a pressure of 4.075 kg/cm²G by introducing thereinto dry pressurized air. While the pressure of the air being processed may be varied by varying the proportion of the part of the hot compressed air from the blower 12 to be passed to the heat exchanger 14 relative to that of the remainder of the hot compressed air to be directly introduced into the dehydrater assembly 13 and also by adjusting the valves 48 and 49, the pressure of the air just leaving the rotor 23 in the dehydrating zone is 3.93 kg/cm²G in one operating example while the pressure of air just leaving the rotor 23 in the regenerating zone is 3.955 kg/cm²G in the same example.

Figure 5:
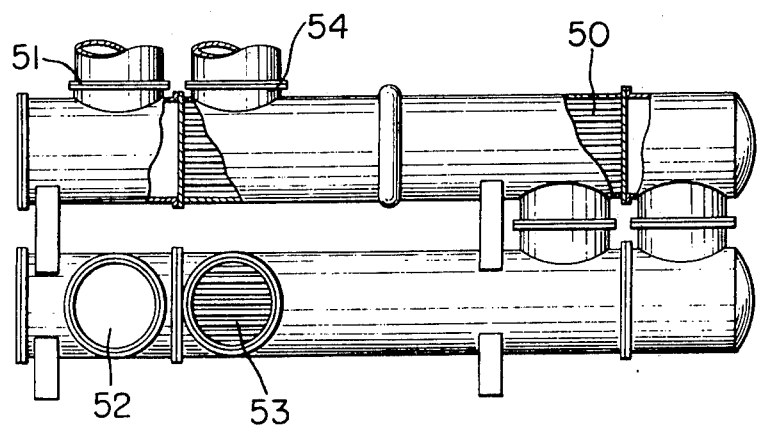
FIG. 5 is a partially cut away enlarged view of the heat exchanger involved in the arrangement of FIG. 1.

FIG. 5 is a partially cut away enlarged view of the heat exchanger 14 shown in FIG. 1. This is a shell and tube type heat exchanger having many (about 3,000) tubes 50 within a shell. Hot compressed air is introduced inside the tubes 50 from the blower 12 through an inlet 51 and is discharged through an outlet 52, whereas dehydrated air is introduced inside the shell but outside the tubes 50 through an inlet 53 and is withdrawn through an outlet 54. In the heat exchanger 14, the dehydrated air coming from the dehydrater assembly 13 is heated by absorbing a part of sensible heat possessed by the hot compressed air coming from the blower.

Figure 6:
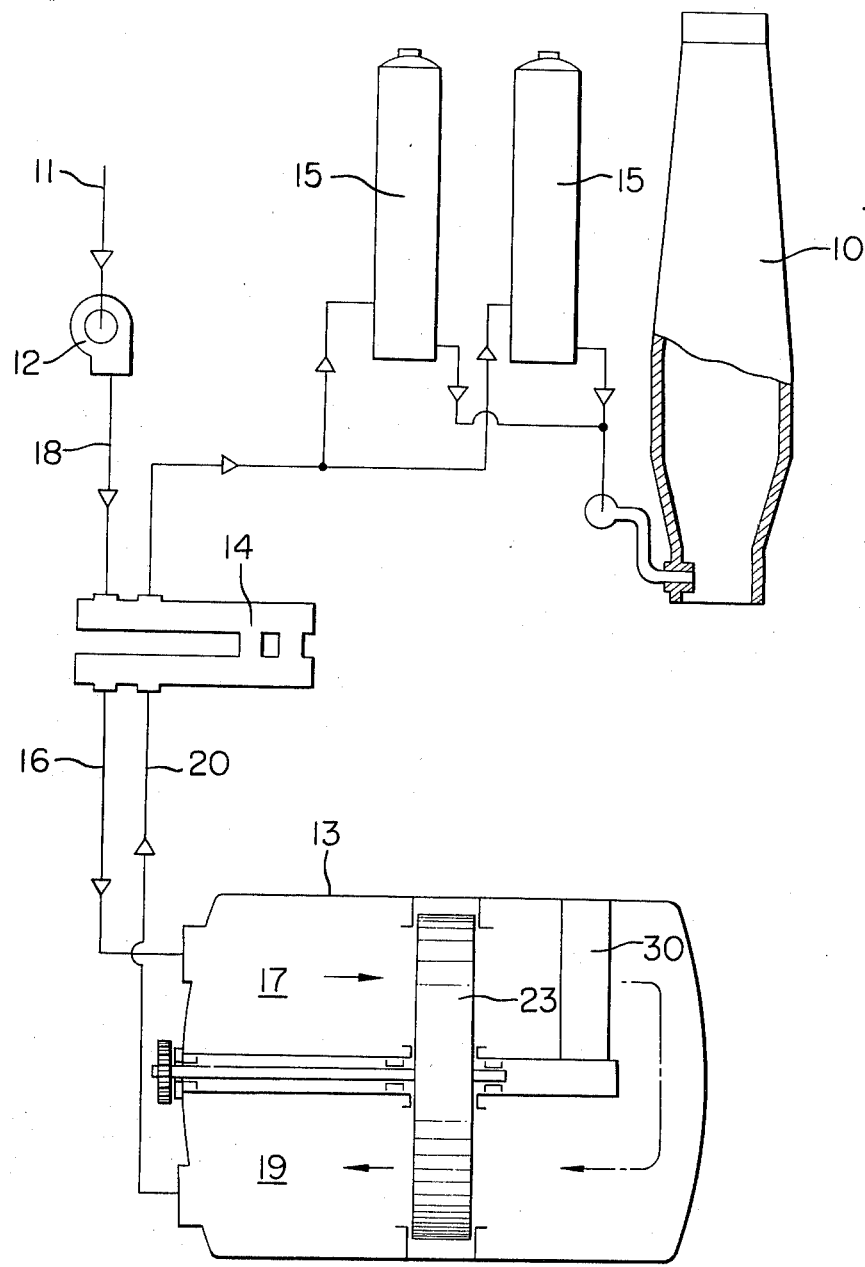
FIG. 6 shows another embodiment of the arrangement in accordance with the invention.

FIG. 6 illustrates another embodiment of the arrangement in accordance with the invention. The arrangement illustrated in FIG. 6 is simplet than that shown in FIG. 1. In the arrangement shown in FIG. 6, all of the hot compressed air from the blower 12 is introduced through the conduit 18 into the heat exchanger 14 and all of the air leaving the heat exchanger is then passed through the conduit 16 to the regenerating zone 17 in the dehydrater assembly 13. After passing through the rotor 23 in the regenerating zone 17 and the cooler 30, the air is caused to pass through the rotor 23 in the dehydrating zone 19 to be dehydrated. The air so dehydrated is then withdrawn from the dehydrater assembly 13 and passed through the conduit 20 to the heat exchanger 14, where it is heated by absorbing a part of the sensible heat possessed by the hot compressed air coming from the blower 12 and, thereafter, introduced into the hot air furnaces 15. The heat exchanger 14 usable in the arrangement shown in FIG. 6 may be of the same type as the heat exchanger 14 usable in the arrangement shown in FIG. 1. Further, the rotor 23 of the dehydrater assembly 13 in FIG. 6 has substantially the same structure as that of the rotor shown in FIGS. 1 through 4, and is provided with the same sealing means as described hereinabove with reference to FIGS. 3 and 4. The cooler 30 diagrammatically shown in FIG. 6 is also similar to the cooler 30 or 35 shown in FIG. 2, that is, a finned tube heat exchanger through which cold water prepared in a refrigerator (not shown) may be passed as a coolant.

It will be understood that since the dehydrating assembly disclosed herein utilizes the air to be treated as hot air regeneration of the rotor 23, it is not necessary to externally supply any hot air in order to regenerate the rotor 23 and, therefore, heatless dehydration can be carried out. It will also be appreciated that the arrangement of the invention makes it possible to drastically reduce only the moisture content of the treated air without significant loss of temperature and pressure, when compared with the known arrangement wherein the blower and the hot air furnaces are directly connected. Furthermore, because of the simple construction, the arrangement of the invention is substantially free from mechanical trouble, ensuring a stable constant operation for a prolonged period of time.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An arrangement for preparing hot compressed air of a reduced moisture content suitable for use in operation of a blast furnace, comprising a conventional blower designed for use in the operation of a blast furnance and one or more conventional hot air furnaces, said blower and said hot air furnaces being so arranged that a passage of air to be supplied to said blast furnace is adapted to be formed from said blower via said hot air furnaces to said blast furnace, characterized in that into the air passage located between said blower and said hot air furnaces there are incorporated:

a dehydrater assembly comprising a gas permeable rotor containing a regenerative hygroscopic substance impregnated therein and at least one cooler for condensing the moisture in the air;

a heat exchanger arranged so that a part of all of hot compressed air coming from said blower may transfer its sensible heat to the dehydrated air coming from said dehydrater assembly;

means for passing the remainder of all of the hot compressed air coming from said blower to said dehydrater assembly; and means for passing all the dehydrated air coming from said dehydrater assembly to said heat exchanger, whereby all the air to be introduced into said hot air furnaces is caused to pass through said dehydrater assembly and heat exchanger, and be dehydrated.

2. An arrangement for preparing hot compressed air of a reduced moisture content suitable for use in operation of a blast furnace, comprising a conventional blower designed for use in the operation of a blast furnace and one or more conventional hot air furnaces, said blower and said hot air furnaces being so arranged that a passage of air to be supplied to said blast furnace is adapted to be formed from said blower via said hot air furnaces to said blast furnace, characterized in that into the air passage located between said blower and said hot air furnaces there are incorporated:

a dehydrater assembly comprising a gas permeable rotor containing a regenerative hygroscopic substance impregnated therein and at least one cooler for condensing the moisture in the air, said assembly further comprising, said assembly further comprising a generally cylindrical casing, spaced parallel partition plates for dividing the inside space of said casing into regenerating and dehydrating zones, said rotor being rotatably mounted so as to radially extend across approximately the full cross-sections of both regenerating and dehydrating zones;

a heat exchanger arranged so that all of hot compressed air coming from said blower may transfer its sensible heat to dehydrated air coming from said dehydrater assembly;

means for passing the air leaving said heat exchanger to said regenerating zone so as to pass it through the rotor in said regenerating zone;

said cooler being arranged so that it may cool air which has passed through said rotor in said regenerating zone;

means for passing a stream of the air, which has passed through said cooler and said rotor in said dehydrating zone, to said heat exchanger; and whereby all the air to be introduced into said hot air furnaces is caused to pass through said dehydrater assembly and heat exchanger, and be dehydrated.

3. An arrangement in accordance with claim 2 wherein a clearance formed between a peripheral surface of said rotor and an inner surface of said casing is sealed by annular packing elements to define an annular space; clearances formed between flat surfaces of said rotor and ends of said partition plates facing said rotor are sealed by elongated packing elements to define elongated space, and; for each of said sealed spaces there is provided a port for introducing dry pressurized air, having a pressure higher than the pressure of the air passing through the regenerating zone, into each of said spaces from a separate source thereby preventing the air from leaking from the regenerating zone into the dehydrating zone.

4. An arrangement in accordance with claim 3, wherein a shaft of said rotor is located in the space between said spaced parallel partition plates.

5. An arrangement in accordance with claim 4, wherein in the space between said spaced parallel partition plates there are provided inside partition walls, each of which has a bearing for rotatably supporting the shaft of said rotor and constitutes one of the walls defining the corresponding elongated space.

6. An arrangement in accordance with claim 3, wherein said cooler is located inside said casing.

7. An arrangement for preparing hot compressed air of a reduced moisture content suitable for use in operation of a blast furnace, comprising a conventional blower designed for use in the operation of a blast furnace and one or more conventional hot air furnaces, said blower and said hot air furnaces being so arranged that a passage of air to be supplied to said blast furnace is adapted to be formed from said blower via said hot air furnaces to said blast furnace, characterized in that into the air passage located between said blower and said hot air furnaces there are incorporated:

a dehydrater assembly comprising a gas permeable rotor containing a regenerative hygroscopic substance impregnated therein and at least two coolers for condensing the moisture in the air, said assembly further comprising a generally cylindrical casing, spaced parallel partition plates for dividing the inside space of said casing into regenerating and dehydrating zones, said rotor being rotatably mounted so as to radially extend across approximately the full cross-sections of both regenerating and dehydrating zones;

a heat exchanger arranged so that a part of hot compressed air coming from said blower may transfer its sensible heat to the dehydrated air coming from said dehydrater assembly;

means for passing the remainder of the hot compressed air coming from said blower to said regenerating zone so as to pass it through the rotor in said regenerating zone;

means for passing said part of the hot compressed air leaving said heat exchanger, after having transferred its sensible heat to the dehydrated air, to said dehydrating zone so as to pass it through the rotor in said dehydrating zone;

one of said coolers being arranged so that it may cool air which has passed through the rotor in said regenerating zone;

the other of said coolers being arranged so that it may cool air which is to pass through the rotor in said dehydrating zone; and means for combining a stream of the dehydrated air which has passed through the rotor in said dehydrating zone with a stream of the dehydrated air which has passed through said first-mentioned cooler and for passing the combined stream of dehydrated air to said heat exchanger, whereby all the air to be introduced into said hot air furnaces is caused to pass through said dehydrater assembly and heat exchanger, and be dehydrated.

8. An arrangement in accordance with claim 7 wherein a clearance formed between a peripheral surface of said rotor and/an inner surface of said casing is sealed by annular packing elements to define an annular space; clearances formed between flat surfaces of said rotor and ends of said partition plates facing said rotor are sealed by elongated packing elements to define elongated spaces, and; for each of said sealed spaces there is provided a port for introducing dry pressurized air, having a pressure higher than the pressure of the air passing through the regenerating zone, into each of said spaces from a separate source thereby preventing the air from leaking from the regenerating zone into the dehydrating zone.

9. An arrangement in accordance with claim 7, wherein the last-mentioned means is provided with means for adjusting the rate of flow of each stream of the dehydrated air.

10. An arrangement in accordance with claim 8, wherein said coolers are located inside said casing.

11. An arrangement in accordance with claim 10, wherein an additional cooler for precooling the air to be caused to pass through the rotor in the regenerating zone is provided in the regenerating zone.

12. An arrangement in accordance with claim 8, wherein a shaft of said rotor is located in the space between said spaced parallel partition plates.

13. An arrangement in accordance with claim 12, wherein in the space between said spaced parallel partition plates there are provided inside partition walls, each of which has a bearing for rotatably supporting the shaft of said rotor and constitutes one of the walls defining the corresponding elongated space.

* * * * *